METHOD OF PRODUCING SEMICONDUCTOR LAYERS BY PRECIPITATION FROM THE GASEOUS PHASE

Filed July 1, 1966

3,574,006
METHOD OF PRODUCING SEMICONDUCTOR LAYERS BY PRECIPITATION FROM THE GASEOUS PHASE

Hansjürgen Dersin, Haidgraben 37, Ottobrunn, Germany, and Erwin Früchte, Balanstr. 151, Munich 9, Germany Filed July 1, 1966, Ser. No. 562,382
Claims priority, application Germany, July 1, 1965, S 97,931
Int. Cl. H01l 7/36
U.S. Cl. 148—174 10 Claims

ABSTRACT OF THE DISCLOSURE

The invention relates to a method for producing semiconductor layers of the same or variable conductance type and/or variable conductivity by precipitating from a gaseous phase upon a monocrystalline carrier body of the same or similar lattice structure. The invention prevents, during the precipitation of the semiconducting layers upon the carrier body, the edges of the carrier discs, which are particularly affected by the action of the reaction gas, from being brought into the growth layer which is comprised of another material. This is achieved by the carrier body for epitactic precipitation being provided on all sides, but at least at the edges, with a protective covering which leaves free only that part of the surface upon which the semiconductor layer is to be precipitated.

Our invention relates to semiconductor devices which comprise two or more layers of respectively different semiconductor materials.

As a rule, the production of such heterogeneous junctions, also called hetero-junctions, requires applying the alloying technique. An attempt, however, to epitaxially grow a layer of semiconductor material upon a different semiconductor material by precipitation from the gaseous phase encounters severe difficulties. This is because the reaction gas being employed dissolves some material from the substrate crystal, at least at the edges thereof, and thus carries substrate material into the layer being grown from the other material. If the valences of the two semiconductor materials differ, the doping effect caused in the epitaxially grown layer by the material dissolved from the substrate manifests itself in a highly detrimental manner.

It is an object of our invention to afford the production of semiconductor layers by precipitation from the gaseous phase upon a monocrystalline substrate of the same or a similar crystal lattice structure, while avoiding the above-described deficiency.

To this end, and according to the invention, we surround the substrate on all sides, or at least at the edges, with a protective envelope which exposes only the surface portion of the substrate upon which the epitaxial growth is to take place.

According to another, more specific feature of the invention, we employ a substrate of a first semiconductor material and epitaxially grow thereupon a monocrystalline layer of a second semiconductor material of a different chemical constitution or composition.

More particularly, we employ as first and second semiconductor materials those whose atoms possess respectively different valencies. For example, the first semiconductor material may be a quadrivalent element or compound, for example germanium, silicon, silicon carbide and the like, whereas the second semiconductor material is constituted by a semiconducting compound whose respective components have valencies that supplement each other to the value four, as is the case for example with $A^{III}B^{V}$ or $A^{II}B^{VI}$ semiconductor compounds.

Another way of performing the method of the invention is to employ as first and second semiconductor materials two semiconductor compounds so chosen that the valencies of the components forming the first material differ from the valencies of the components forming the second material. For example, the first semiconductor material may be constituted by an $A^{III}B^{V}$ compound, and the second material by an $A^{II}B^{VI}$ compound.

Furthermore, the two semiconductor materials may possess the same or respectively different types of conductivity and/or different electrical specific resistances (conductivity values).

According to a preferred embodiment of the invention, we employ as protective enclosure or envelope for the substrate crystal a closable vessel of inert material, for example quartz, carbon, aluminum oxide (sintered alumina) or the like. The closable vessel or enclosure, however, may also consist of other materials, particularly of the same semiconductor material as the one to be precipitated upon the substrate. Furthermore, the method may be simplified by providing the substrate crystal with a vapor-deposited coating of inert material such as quartz, aluminum oxide or the like. This coating then serves as the protective envelope in lieu of the above-mentioned closable vessel.

According to another way of performing the method of the invention, the production of the semiconductor epitaxial layer upon the substrate is effected by a transport reaction between two semiconductor bodies placed one on top of the other. In this case the protective enclosure or envelope simultaneously serves as a spacer. This mode of the method is of advantage particularly if the grown layer is to be produced with the aid of the so-called sandwich epitaxy. In this case, two semiconductor wafers or other layers consisting of respectively different semiconductor material are placed face-to-face in direct thermal contact with each other and subjected to the effect of a reaction gas. The transport of the semiconductor material then takes place from the top side of a semiconductor wafer consisting of source material to the surface of the substrate crystal facing the source wafer, the reaction space proper being the interspace between the source wafer and the substrate crystal.

Semiconductor devices made according to the invention and thus comprising at least two regions of respectively different semiconductor materials are advantageously applicable for numerous electronic and other semiconductor components such as diodes or transistors.

The invention will be further described by way of example with reference to the accompanying drawing in which.

Figure 1:
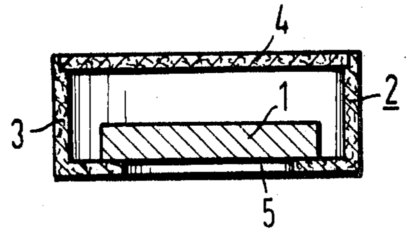
FIG. 1 shows schematically and in section a substrate crystal within a protective envelope.

Referring to FIG. 1, there is illustrated a substrate crystal 1 of monocrystalline silicon surrounded by a closable protective housing 2 composed of a cup-shaped bottom portion 3 and a cover 4. The silicon monocrystal 1, polished and having its surface cleaned from impurities by etching, is placed into the cup-shaped portion 3, whereafter the vessel is closed by means of the cover 4. The bottom portion 3 has an opening 5 whose size corresponds to the surface area upon which the epitaxial layer is to be grown. During the subsequent precipitation of semiconductor material the protective enclosure prevents the undesired dissolution of substrate material. Although such dissolution is very slight, occurring mainly at the edges and at the surface areas not covered by the epitaxial layer, it would result in undesired doping of the epitaxial layer, due to the different valencies of the substrate material and the layer material. Such dissolution, however, is virtually prevented completely by the enclosure described above. This enclosure may consist of carbon, alumina, quartz or of the same semiconductor material as the one to be precipitated. It is only essential that the protective enclosure, when subjected to the reaction temperature, does not cause impurities to enter into the semiconductor layer being produced.

Figure 2:
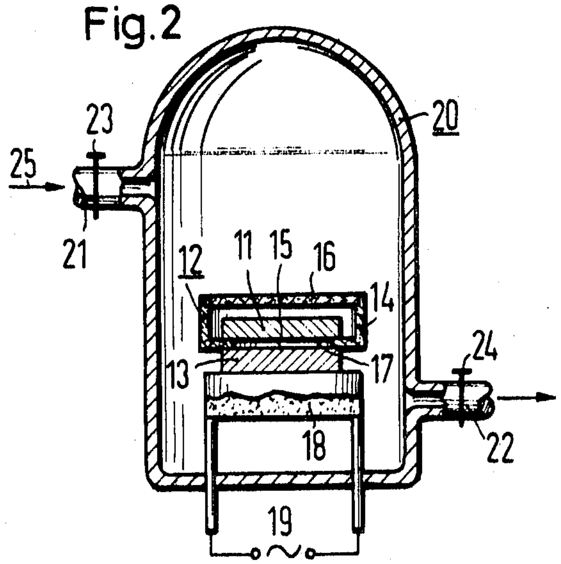
FIG. 2 shows schematically and in section a processing apparatus containing a protective enclosure similar to that of FIG. 1.

In the embodiment of the method now to be described with reference to FIG. 2, the epitaxial layer is grown with the aid of a chemical transport reaction in which the protective enclosure simultaneously serves as a spacer.

A monocrystalline disc or wafer 11 of germanium is accommodated within a protective housing 12 of inert material, for example $Al_2O_3$, which is placed on top of a wafer 13 consisting of the material to be transported, for example gallium arsenide. The opening 15 in the cup-shaped portion 14 of the housing 12 faces the source wafer 13. The cover 16 forms the top closure of the housing 12.

The transport of material in this arrangement takes place within the interspace 17 between the wafers 11 and 13 and is limited in area by that of the window opening 15.

The gallium arsenide wafer 13 is placed on top of a heater 18 whose external terminals 19 are to be connected to a voltage source. The entire arrangement is accommodated within a reaction vessel 20 of quartz with an inlet nipple 21 for the reaction gas mixture and an outlet nipple 22 for the residual gases. The nipples are provided with respective valves 23 and 24 with whose aid the reaction vessel 20 can be completely or partially closed. The flow direction of the gas is indicated by an arrow 25.

A mixture of steam and hydrogen is used as the reaction gas. The flow velocity of the gas is about 70 liter per hour at a hydrogen partial pressure of about 5 to 20 torr. The formation of a detrimental oxide coating on the germanium surface is prevented by the steam, since germanium oxide ($GeO_2$) is completely reduced by hydrogen. The reaction temperature is approximately 900° C. The transport of the gallium arsenide takes place in accordance with the reaction equation $$2GaAS(f)+H_2O(g)=Ga_2O(g)+H_2+2/xAs_x(g)$$

wherein $(f)$ denotes "solid," $(g)$ denotes "gaseous" and $(x)$ denotes any chosen number of atoms in the molecule.

Analogously applicable, for example, is gallium phosphide as the first semiconductor material (in lieu of germanium), and zinc sulfide as the second semiconductor material. In the latter case, a monocrystalline wafer of gallium phosphide is placed into a protective housing of inert material, for example quartz, and is placed upon a source wafer of zinc sulfide. Employed as transporting medium is a mixture of iodine and hydrogen in the molar ratio of 0.005–0.01. The transport of the zinc sulfide takes place at a reaction temperature of 1000 to 750° C. in accordance with the reaction equation $$ZnS(f)+I_2(g)=ZnI_2(g)+S_2(g)$$

wherein the letters $(f)$ and $(g)$ denote "solid" and "gaseous" respectively.

There are numerous other possibilities of combination and variation with respect to the materials employed, as well as relative to the transport systems and the design of the protective enclosure. Thus, FIG. 3 exemplifies an arrangement in which a pulverulent source material, for example a semiconductor compound such as gallium arsenide, is placed into the reaction vessel itself. The reaction gas converts the pulverulent material to the vaporous phase and transports it to the disc- or wafer-shaped substrate crystal of a different semiconductor material, for example silicon, located at a different place of the reaction vessel, where the semi-conductor compound segregates from the carrier gas and precipitates upon the substrate.

The tubular reaction vessel 30 of quartz is placed into a furnace 31 and terminates at both axial ends into tubes 32 and 33 for supplying the reaction gas and for discharging the residual gas respectively. The inlet and outlet tubes 32 and 33 can be entirely or partially closed by respective valves 34 and 35. The flow direction of the reaction gas is indicated by an arrow 36.

Located within the reaction vessel are several monocrystalline silicon wafers 37 to serve as substrates for the epitaxial layers to be grown. Each substrate wafer 37 is surrounded by a protective envelope 38 constituted by a silicon-oxide coating. The coating is produced by superficial oxidation of the silicon and thus tightly envelops the silicon wafer 37 with the exception of a window opening 39. As mentioned, pulverulent gallium arsenide 40 is also placed into the reaction vessel 30 in spaced relation to the silicon wafers.

The substrates 37 and the pulverulent source material 40 are heated by means of the furnace 31 which can be set to different temperature distributions along its axis. The heating is effected in such a manner that a temperature gradient is maintained between the source material 40 and the substrate wafers 37. For example, the temperature of the source material is kept at about 1050° C., and the temperature of the substrate crystals at about 1000° C.

The reaction gas, entering through the inlet tube 32 at a rate of 1 liter per minute for example, consists of a mixture of steam and hydrogen at a steam partial pressure of 10 torr and reacts with the pulverulent gallium arsenide 40 in accordance with the reaction equation $$2GaAs(f)+H_2O(g)=Ga_2O(g)+H_2+2/xAs_x(g)$$

wherein the letters $(f)$, $(g)$ and $(x)$ have the meaning explained above. The gaseous mixture of gallium oxide ($Ga_2O$) and arsenic vapor then reaches the silicon wafers heated to about 1000° C. where the mixture becomes dissociated. The evolving gallium arsenide then grows on the surface portion of the silicon that remains exposed through the window opening 39 of the envelope 38. The area dimensions of the epitaxially grown layer thus are those of the opening 39.

Figure 3:
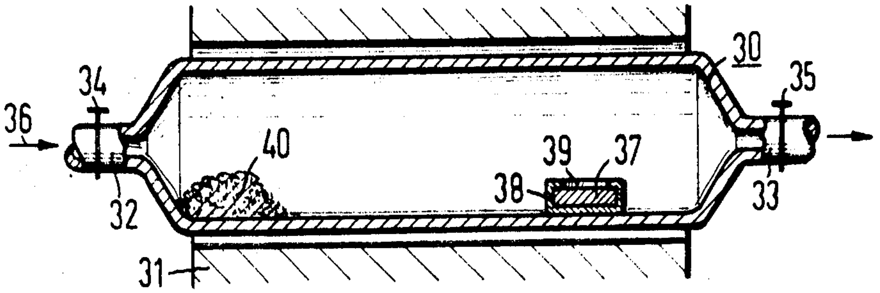
FIG. 3 shows schematically and in section another apparatus for performing the method of the invention.

A processing arrangement corresponding substantially to that described with reference to FIG. 3 is also advantageously applicable if the production of the epitaxial layer is effected by pyrolysis of a reaction gas containing a gaseous compound of the semiconductor material to be precipitated. In this case, no source material need be accommodated separately within the reaction vessel. The semiconductor wafers to serve as substrates for the epitaxial layer are placed either upon a heated support from which they are heated up to the reaction temperature, or they are brought to the necessary temperature by heat transfer from the heated vessel walls. However, the substrate wafers may also be heated by electrical induction.

This method is of advantage for example if a monocrystalline layer of germanium is to be grown on a monocrystalline wafer of gallium arsenide or gallium phosphide. In this case, monocrystalline wafers of gallium arsenide, for example, are surrounded by a protective envelope of carbon and placed into the reaction vessel. The reaction vessel is then heated to the precipitation temperature of germanium, and a mixture of germanium iodide and hydrogen is supplied into the vessel to serve as a gaseous source material and as reaction gas. The germanium iodide is pyrolytically dissociated, and the liberated germanium precipitates upon the substrate crystals of gallium arsenide or gallium phosphide. The epitaxial growth then occurs only on the area of each substrate crystal that remains exposed through the opening of the protective envelope.

The hetero-junctions made by the above-described method according to the invention are directly applicable to further fabrication into semiconductor devices, for example rectifiers and other diodes, or transistors and other triodes.

To those skilled in the art it will be obvious upon a study of this disclosure that our invention permits of various modifications and may be given embodiments other than particularly illustrated herein, without departing from the essential features of the invention and within the scope of the claims annexed hereto.

We claim:

1. The method of producing semiconductor layers by segregation of layer material from the gaseous phase upon a monocrystalline substrate of the same or similar lattice structure as the layer material, which comprises placing the substrate in a protective enclosure formed of at least two parts, leaving an opening in said protective enclosure through which a surface area of the substrate remains exposed while the edges are enclosed, and segregating the semiconducting layer material through the opening onto the exposed surface area of the substrate by transport reaction from a source of layer material, and interposing the enclosure between the source and the substrate to serve as a spacer for providing an interspace for the transport reaction.

2. The method according to claim 1, wherein the monocrystalline substrate is formed of a first semiconductor material and the layer material is formed of a second semiconductor material different from that of said first material, and epitaxially growing the layer on the surface area exposed through said opening.

3. The method according to claim 1, wherein the substrate material and the layer material contain atoms of respectively different valencies.

4. The method according to claim 1, wherein the substrate material has quadrivalent atoms and the layer material is formed of semiconducting components having components whose valencies complement each other to the value four.

5. The method according to claim 4, wherein the substrate material is formed of germanium, silicon or silicon carbide and the layer material is formed of a semiconducting $A^{III}B^{V}$ or $A^{II}B^{VI}$ compound.

6. The method according to claim 1, wherein the substrate material and the layer material are formed of respectively different semiconductor compounds, the valencies of the components forming the substrate material being different from the valencies of the components forming the layer material.

7. The method according to claim 6, wherein the substrate material is formed of $A^{III}B^{V}$ compound and the layer material is formed of $A^{II}B^{VI}$ compound.

8. The method according to claim 1, wherein the substrate material and the layer material have respectively different types of conductivity.

9. The method according to claim 1, wherein the substrate material and the layer material have respectively different specific electrical resistances.

10. The method according to claim 1, wherein the enclosure is formed of quartz, carbon or alumina.

References Cited

UNITED STATES PATENTS

| | | | |
|---|---|---|---|
| 3,072,507 | 1/1963 | Anderson et al. | 148—175X |
| 3,140,965 | 7/1964 | Reuschez | 148—175 |
| 3,156,591 | 11/1964 | Hale et al. | 148—175 |
| 3,224,912 | 12/1965 | Ruehrwein | 148—175 |
| 3,265,542 | 8/1966 | Hirshon | 148—175 |
| 3,291,657 | 12/1966 | Sirtl | 148—175 |
| 3,296,040 | 1/1967 | Wigton | 148—175 |
| 3,312,570 | 4/1967 | Ruehrwein | 148—175 |
| 3,359,143 | 12/1967 | Heywang et al | 148—174 |

RICHARD O. DEAN, Primary Examiner

U.S. Cl. X.R.

148—175; 117—106